United States Patent [19]

Hooykaas

[11] Patent Number: 5,304,706

[45] Date of Patent: Apr. 19, 1994

[54] FIXING AGENT FOR FIXING ORGANIC AND INORGANIC IMPURITIES CONTAINING MATERIAL, METHOD FOR FIXING SUCH MATERIAL AND A SYNTHETIC CLAY MATERIAL

[75] Inventor: Carel W. J. Hooykaas, Rotterdam, Netherlands

[73] Assignee: Pelt & Hooykaas B.V., Rotterdam, Netherlands

[21] Appl. No.: 26,494

[22] Filed: Mar. 4, 1993

[30] Foreign Application Priority Data

Mar. 9, 1992 [NL] Netherlands ............... 9200430

[51] Int. Cl.⁵ .................. B09B 3/00; E02D 3/12
[52] U.S. Cl. .................. 588/252; 405/128; 405/266; 588/257
[58] Field of Search .............. 588/252, 256, 257; 405/128, 129, 263, 266, 267

[56] References Cited

U.S. PATENT DOCUMENTS

| | | |
|---|---|---|
| 3,837,872 | 9/1974 | Conner . |
| 4,149,968 | 4/1979 | Kupiec et al. . |
| 4,386,010 | 5/1983 | Hildebrant . |
| 4,650,590 | 3/1987 | Beall . |
| 4,744,829 | 5/1988 | Eirich et al. .......... 588/256 X |
| 5,177,305 | 1/1993 | Pichat ................. 588/257 |

FOREIGN PATENT DOCUMENTS

| | | |
|---|---|---|
| 842206 | 9/1976 | Belgium . |
| 1024277 | 5/1977 | Canada . |
| 0301858 | 2/1989 | European Pat. Off. . |
| 0408545 | 1/1991 | European Pat. Off. . |
| 0482718 | 4/1992 | European Pat. Off. . |
| 6917269 | 5/1970 | Netherlands . |
| 2224024 | 4/1990 | United Kingdom . |

Primary Examiner—David H. Corbin
Attorney, Agent, or Firm—Fiddler, Levine & Mandelbaum

[57] ABSTRACT

The invention relates to a fixing agent, for fixing organic and inorganic impurities containing material, which comprises an organophilic clay material and a clay-growth agent. The clay-growth agent comprises at least one magnesium compound and/or at least one aluminium compound, and an initiator for clay formation. This initiator is a silicon-containing material, such as a glass or a silicon-containing rock, such as pumice, basalt or andasite. The magnesium compound preferably originates from granulated blast furnace slags, or is magnesium oxide, whereas the aluminium compound is expediently aluminium oxide or an alumina containing material. An oxidising agent can also be present. A method for fixing organic and inorganic impurities containing material to an at least partially organophilic clay material in an aqueous medium, and, if desired, hardening the resulting material using an inorganic reagent and, where appropriate, a hardening activator, is also described. This method is in particular characterised in that the organic and inorganic impurities containing material is also fixed to and/or enclosed in clay material to be formed in situ. Finally, a synthetic clay material is described which can be obtained from a mixture of ferric sulphate, magnesium oxide and/or aluminium oxide, potassium persulphate, silicon oxide and, optionally, manganese sulphate and/or aluminium sulphate.

25 Claims, No Drawings

FIXING AGENT FOR FIXING ORGANIC AND INORGANIC IMPURITIES CONTAINING MATERIAL, METHOD FOR FIXING SUCH MATERIAL AND A SYNTHETIC CLAY MATERIAL

BACKGROUND OF THE INVENTION

The invention relates to a fixing agent for fixing organic and inorganic impurities containing material, at least comprising an organophilic clay material.

A fixing agent of this type is known and comprises and organophilic clay such as a smectite, and more particularly a modified clay, which material in particular is capable of binding the organic impurities which are sparingly soluble in water. By additionally incorporating a quantity of unmodified clay in the fixing agent, it is also possible to bind the inorganic impurities present. A material comprising impurities of this type can then be converted, using a cement, into a product which has the characteristics of hardened concrete.

It is pointed out that, as a result of the increasingly stringent requirements as laid down in several laws and regulations relating to the processing and re-use of toxic waste, there is a growing need for agents and processes for binding toxic substances, both of inorganic and of organic nature, in such a way that leaching-out is virtually impossible. In addition, agents which make in situ immobilisation possible are being increasingly preferred.

Further, it is pointed out that by toxic waste of inorganic nature also material comprising radioactive cations must be understood. Because such impurities are, already in small amounts, a threat for man and beast, a material with which such impurities can be captured and thus be made harmless, is extremely desirable.

SUMMARY OF THE INVENTION

Surprisingly, a fixing agent for fixing organic and inorganic waste has now been found which can comply with this requirement for in situ immobilisation.

The fixing agent according to the invention is characterised in that it also comprises a clay-growth agent. The consequence of the presence of the clay-growth agent is that an existing clay matrix can increase in size, as a result of which more impurities can be bound to the clay matrix and therefore can be immobilised.

Preferably, the clay-growth agent comprises at least one magnesium compound and/or one aluminium compound, as well as an initiator for clay formation. The presence of such an initiator offers the possibility for allowing the growth of the clay matrix to take place at a chosen, arbitrary time.

Expediently the initiator for clay formation comprises a silicon-containing material, preferably a glass or a silicon-containing rock. In connection with its function as initiator, the silicon-containing material must be as fine as possible.

If a silicon-containing rock is used as initiator for clay formation said rock preferably has a high $SiO_2$ content. Examples of such material are pumice, basalt or andasite. However, this list is not limiting; other mineral substances can also be used as initiator for clay formation provided the $SiO_2$ content thereof is sufficiently high.

The fixing agent according to the invention preferably contains approximately 1 to 6% by weight of silicon-containing material as initiator, this quantity being calculated as the $SiO_2$ content.

The magnesium compound present in the fixing agent preferably originates from granulated blast furnace slags or is magnesium oxide, whereas the aluminium compound is preferably aluminium oxide or an alumina containing material.

Expediently the clay-growth agent also comprises an oxidising agent, preferably a persulphate and in particular potassium persulphate. Although the effect of an oxidising agent for clay formation is not entirely clear, it is assumed that it acts more or less as a reaction accelerator because it is capable of liberating the latent energy present in glass and in natural rock having a high $SiO_2$ content and using this energy for clay formation.

The fixing agent according to the invention also preferably comprises an iron compound, in particular iron-(III) sulphate. If desired, the fixing agent can also comprise a manganese compound, such as manganese sulphate.

The invention also relates to a method for fixing organic and inorganic impurities containing material to an at least partially organophilic clay material in an aqueous medium and, if desired, hardening the resulting material using an inorganic reagent and, where appropriate, a hardening activator.

A method of this type is disclosed in Netherlands Patent Application No. 8901240. The clay mineral used in this method is a modified type of clay, as a result of which organic compounds can also be absorbed on the clay.

However, the drawback of this known method is that the amount of material to be absorbed on the clay is dependent on the amount of clay present. In practice it is consequently frequently compulsory to use a sufficient excess of clay material to be able to be sure that the material will comply with diverse leaching tests after incorporation in a cement matrix.

A method has now been found which overcomes this drawback.

The method according to the invention is characterised in that the organic and inorganic impurities containing material is also fixed to and/or enclosed in clay material to be formed in situ. The in situ formation of clay has the additional advantage that the clay matrix is, as it were, formed around the material to be fixed, as a result of which excellent fixing is obtained and leaching-out, even over time, is virtually impossible. This is of great importance, especially when large organic molecules are present which can be adsorbed only at the surface of a clay matrix.

Moreover, waste material may comprise radioactive cations, such as for example cesium; such cations are also captured expediently by means of the in situ formation of clay.

Preferably, the clay material is formed in situ using a clay-growth agent which comprises at least one magnesium compound and/or one aluminium compound as well as an initiator for clay formation.

Expediently the initiator for clay formation consists of a silicon-containing material, in particular a glass or a silicon-containing rock, which, for example, can be chosen from pumice, basalt or andasite. However, another rock can also be used provided the silicon oxide content thereof is sufficiently high.

It has been found that the use of 1 to 6% by weight of silicon-containing material, calculated as the $SiO_2$ content thereof, gives good results.

The magnesium compound used preferably consists of magnesium oxide. An advantageous alternative is a magnesium compound which can be obtained from granulated blast furnace slags. It is pointed out that granulated blast furnace slags can contain up to about 12% of magnesium oxide, so that the use of such slags on the one hand leads to an expansion of the clay matrix and on the other hand can make it possible to form a cement matrix.

As the aluminium compound preferably aluminium oxide or an alumina containing material is used.

More particularly, the clay material is formed in the presence of an oxidising agent, preferably a persulphate, such as potassium persulphate, and an iron compound, preferably iron(III) sulphate. It is assumed that the oxidising agent results in an acceleration of the clay formation reaction.

Finally, the invention also relates to a synthetic clay material which can be formed from a mixture of a magnesium compound, and/or an aluminium compound, an iron compound, an oxidising agent and an initiator for clay formation, the oxidising agent preferably consisting of potassium persulphate, whilst the initiator for clay formation is a silicon oxide-containing material, such as a glass. The clay material can expediently be obtained form a mixture of 15-25 parts of ferric sulphate, 15-28 parts of magnesium oxide and/or aluminium oxide, 10-25 parts of potassium persulphate, 1-6 parts of silicon oxide and, optionally, 15-25 parts of manganese sulphate and/or 10-20 parts of aluminium sulphate.

DESCRIPTION OF THE PREFERRED EMBODIMENTS

Example 1

A bentonite clay modified by alkylammonium groups was finely ground to a particle size of about 200 mesh. This bentonite clay was then incorporated in a fixing agent composition, to which a hardening agent having the following composition and concentration:

2.5% of magnesium oxide,
2.0% of potassium persulphate,
2.5% of ferric sulphate,
6% of gypsum,
50% of Portland cement, and
31% of granulated blast furnace slags
had also been added.

3% by weight of very finely ground glass were added, as initiator for clay formation, to the mixture thus formed.

This mixture is used for the immobilisation of liquid industrial waste which contained a large amount of saturated long-chain hydrocarbons. The total concentration of the organic compounds was about 12%.

An aqueous suspension was obtained from the above mixture, consisting of fixing agent, hardening agent and industrial waste, and this suspension was allowed to harden for 28 days.

The leaching-out tests carried out with the hardened material showed no detectable organic compounds.

For comparison, the above experiment was repeated but without the addition of the finely ground glass.

The leaching-out tests carried out with the hardened material obtained after this test showed organic compounds in a total concentration of about 3%.

Examination of the hardened material, obtained in both cases, under the microscope surprisingly showed that the clay matrix was appreciably larger in the first material described above.

It is pointed out that the presence of gypsum leads to delayed hardening of the cement matrix. This mechanism is, incidently, known per se. However, in the process under consideration it is, as a result, also possible, if sufficient gypsum is present, also to be able to detect growth of the clay matrix even before complete hardening.

Example 2

Example 1 was repeated but only 1.5% of magnesium oxide were used, as well as 2.5% of manganese sulphate.

The results of the leaching-out tests carried out with the material formed were completely comparable with those of the product obtained according to Example 1. Comparative examination under the microscope of the hardened material formed and material obtained without the addition of glass showed, in this case also, that the addition of glass had resulted in the formation of a larger clay matrix.

Example 3

Example 1 was repeated, but in place of 3% by weight of glass an equivalent amount, with respect to the $SiO_2$ content, of pumice in the finely ground state was used.

The results were the same as those of Examples 1 and 2.

Replacement of pumice by basalt or andasite gave the same results.

Example 4

Example 1 was repeated, but by using an aqueous material contaminated with radioactive cations such as $^{137}Cs$ as industrial waste material.

After the test, the radioactive cations appeared to be adsorbed and encapsulated into the clay matrix completely.

The leaching-out tests carried out with the end-product gave as a result values which remained largely under the current standards.

What is claimed is:

1. A fixing agent for fixing organic and inorganic impurities containing material, at least comprising an organophilic clay material, wherein the fixing agent also comprises a claygrowth agent, comprising an initiator for clay formation, an oxidising agent and a compound chosen from a magnesium compound, an aluminum compound, or a combination thereof.

2. A fixing agent according to claim 1, wherein the initiator for clay formation consists of a silicon-containing material.

3. A fixing agent according to claim 2, wherein the silicon-containing material consists of a glass or a silicon-containing rock.

4. A fixing agent according to claim 3, wherein the silicon-containing rock consists of pumice, basalt or andasite.

5. A fixing agent according to claim 2, wherein the fixing agent contains 1-6% by weight of silicon-containing material, calculated as the $SiO_2$ content of the material.

6. A fixing agent according to claim 1, wherein the magnesium compound originates from granulated blast furnace slags or is magnesium oxide.

7. A fixing agent according to claim 1, wherein the aluminum compound consists of aluminum oxide or an alumina containing material.

8. A fixing agent according to claim 1, wherein said oxidising agent is a persulphate.

9. A fixing agent according to claim 1, wherein the clay-growth agent also comprises an iron compound.

10. A fixing agent according to claim 1, wherein said oxidizing agent is potassium persulphate.

11. A fixing agent according to claim 9, wherein said iron compound is iron (III) sulphate.

12. A method for fixing organic and inorganic impurities containing material to an at least partially organophilic clay material in an aqueous medium, and, if desired, hardening the resulting material using an inorganic reagent and, where appropriate, a hardening activator, wherein the organic and inorganic impurities containing material is also fixed to and/or enclosed in clay material to be formed in situ.

13. A method according to claim 12, wherein the clay material is formed in situ using a clay-growth agent which comprises an initiator for clay formation, an oxidising agent and a compound chosen from a magnesium compound, an aluminum compound, or a combination thereof.

14. A method according to claim 13, wherein the initiator for clay formation consists of a silicon-containing material.

15. A method according to claim 14, wherein the silicon-containing material is chosen from pumice, basalt or andasite.

16. A method according to claim 12, wherein the clay material is formed using 1-6% by weight of silicon-containing material, calculated as the $SiO_2$ content of the material.

17. A method according to claim 13, wherein the magnesium compound is obtained from granulated blast furnace slags, or consists of magnesium oxide.

18. A method according to claim 13, wherein as aluminium compound aluminium oxide or an alumina containing material is used.

19. A method according to claim 12, wherein the clay material is formed in the presence of an iron compound and an oxidising agent, consisting of a persulphate.

20. A method according to claim 13, wherein the silicon containing material is a glass.

21. A method according to claim 19, wherein said persulphate is potassium persulphate and said iron compound is iron (III) sulphate.

22. A synthetic clay material to be formed from a mixture of an iron compound, an oxidising agent, an initiator for clay formation, and a compound chosen from a magnesium compound, an aluminum compound or a combination thereof.

23. A synthetic clay material according to claim 21, wherein the oxidizing agent is potassium persulphate and the initiator for clay formation is a silicon oxide-containing material.

24. A synthetic clay material according to claim 21, wherein the clay material can be obtained from a mixture of:

15-25 parts of ferric sulphate,
15-28 parts of magnesium oxide and/or aluminium oxide,
10-25 parts of potassium persulphate,
1-6 parts of silicon oxide,
and optionally,
15-25 parts of manganese sulphate and/or
10-20 parts of aluminium sulphate.

25. A synthetic clay according to claim 23, wherein the silicon-containing material is a glass.

* * * * *